(12) United States Patent
Sakata

(10) Patent No.: US 9,832,618 B2
(45) Date of Patent: Nov. 28, 2017

(54) VEHICLE-MOUNTED DEVICE USED IN INTELLIGENT TRANSPORT SYSTEM, COMMUNICATION METHOD, AND INTELLIGENT TRANSPORT SYSTEM USING THESE DEVICE AND METHOD

(71) Applicant: NEC Corporation, Minato-ku, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 14/910,747

(22) PCT Filed: Aug. 20, 2014

(86) PCT No.: PCT/JP2014/004266
§ 371 (c)(1),
(2) Date: Feb. 8, 2016

(87) PCT Pub. No.: WO2015/037190
PCT Pub. Date: Mar. 19, 2015

(65) Prior Publication Data
US 2016/0198315 A1 Jul. 7, 2016

(30) Foreign Application Priority Data

Sep. 13, 2013 (JP) ................................. 2013-190155

(51) Int. Cl.
*H04W 4/08* (2009.01)
*H04W 4/04* (2009.01)
(Continued)

(52) U.S. Cl.
CPC ........ *H04W 4/08* (2013.01); *G08G 1/096716* (2013.01); *G08G 1/096741* (2013.01);
(Continued)

(58) Field of Classification Search
CPC ..... H04W 4/08; H04W 4/046; H04W 72/005; G08G 1/096716; G08G 1/096741;
(Continued)

(56) References Cited

U.S. PATENT DOCUMENTS

| 2007/0177502 A1* | 8/2007 | Hama ................... H04L 1/1628 370/229 |
| 2010/0232405 A1* | 9/2010 | Kikuchi ................ H04W 4/001 370/338 |
| 2013/0012253 A1* | 1/2013 | Yamamoto ....... G08G 1/096716 455/509 |

FOREIGN PATENT DOCUMENTS

| JP | 2005-020162 A | 1/2005 |
| JP | 2005-057442 A | 3/2005 |

(Continued)

OTHER PUBLICATIONS

International Search Report for PCT Application No. PCT/JP2014/004266, dated Nov. 4, 2014.
(Continued)

*Primary Examiner* — Jianye Wu

(57) ABSTRACT

An intelligent transport system includes an access point which puts a plurality of channels under control and casts various information and a vehicle-mounted device which directly communicates with the access point or is mounted on a vehicle which performs multi-hop communication, the access point includes broadcast means which broadcast a content of the information to be casted to a plurality of channels as service information, and the vehicle-mounted device includes channel switching means which perform a channel switching so that a desired service can be received on the basis of the service information.

5 Claims, 6 Drawing Sheets

(51) Int. Cl.
*H04W 72/00* (2009.01)
*G08G 1/0967* (2006.01)
*H04L 29/08* (2006.01)

(52) U.S. Cl.
CPC . *G08G 1/096758* (2013.01); *G08G 1/096775* (2013.01); *G08G 1/096791* (2013.01); *H04L 67/12* (2013.01); *H04W 4/046* (2013.01); *H04W 72/005* (2013.01)

(58) Field of Classification Search
CPC ....... G08G 1/096758; G08G 1/096791; G08G 1/096775; H04L 67/12
See application file for complete search history.

(56) References Cited

FOREIGN PATENT DOCUMENTS

| | | |
|---|---|---|
| JP | 2005-150848 A | 6/2005 |
| JP | 2007-266697 A | 10/2007 |
| JP | 2007-282180 A | 10/2007 |
| JP | 2010-133899 A | 6/2010 |
| JP | 2011-193096 A | 9/2011 |
| WO | 2011/111282 A1 | 9/2011 |

OTHER PUBLICATIONS

English translation of Written opinion for PCT Application No. PCT/JP2014/004266.

\* cited by examiner

VEHICLE-MOUNTED DEVICE USED IN INTELLIGENT TRANSPORT SYSTEM, COMMUNICATION METHOD, AND INTELLIGENT TRANSPORT SYSTEM USING THESE DEVICE AND METHOD

This application is a National Stage Entry of PCT/JP2014/004266 filed on Aug. 20, 2014, which claims priority from Japanese Patent Application 2013-190155 filed on Sep. 13, 2013, the contents of all of which are incorporated herein by reference, in their entirety.

TECHNICAL FIELD

The present invention relates to a vehicle-mounted device used in an advance transport system, a communication method, and an advanced transport system using these device and method.

BACKGROUND ART

A communication system including a roadside device placed along a road or the like and a vehicle-mounted device mounted on a vehicle in which road-to-vehicle communication is performed by the roadside device and the vehicle-mounted device and vehicle-to-vehicle communication is performed by the vehicle-mounted devices is proposed (refer to patent literature 1).

Today, in Intelligent Transport system (ITS), two kinds of wireless channels: a control channel (CCH) used for sharing information with a high priority such as an ID, location information, and the like of both devices and a service channel (SCH) used for transmitting and receiving a wide range of information other than the ID, the location information, and the like are used and one of two kinds of wireless channels is selected and used. The use of two kinds of the wireless channels means the use of two sets of transceivers. Accordingly, two sets of transceivers are installed in each of the roadside device placed along the road or the like and the vehicle-mounted device mounted on the vehicle. One of the transceivers is used for the CCH and the other is used for the SCH. In this case, the transceiver used for the CCH or the SCH is not specified.

In the following explanation, a vehicle to be targeted is referred to as a target vehicle, a vehicle with which this target vehicle communicates is referred to as a counter vehicle, and a vehicle which relays communication is referred to as a hopping vehicle. Further, the roadside device is referred to as an access point.

In such ITS, the provision of service information using the SCH is studied. As such service information, information used for driving a vehicle such as information about traffic jam, information about weather conditions, information about accident, and the like (hereinafter, referred to as driving-related information) and information about the Internet and entertainment (for example, a TV program or the like) (hereinafter, referred to as content-related information) may be supplied and these information are transmitted by a packet. Each of these information is transmitted by using a different broadcasting frequency. Therefore, a user has to tune the frequency of the SCH to the broadcasting frequency in order to acquire the information desired by the user. Hereinafter, the channels through which a plurality of service information are provided are described as SCH_1, SCH_2, and the like.

However, as mentioned above, because only two sets of transceivers are installed and one of two sets is reserved for the CCH, the remaining one set has to be used for the SCH. Accordingly, in a case in which the target vehicle and the counter vehicle perform vehicle-to-vehicle communication by using the SCH_1, when the target vehicle changes a channel from the SCH_1 to the SCH_2 to receive the service information provided on the SCH_2, the vehicle-to-vehicle communication between the target vehicle and the counter vehicle cannot be performed.

Accordingly, in Japanese Patent Application Laid-Open No. 2011-193096, a configuration in which when the target vehicle changes a channel from the SCH_1 to the SCH_2, the target vehicle notifies the counter vehicle of information indicating that the channel is changed is disclosed.

By using this configuration, while performing vehicle-to-vehicle communication between the target vehicle and the counter vehicle, the target vehicle can receive the service information provided on the SCH_2.

CITATION LIST

Patent Literature (Patent Literature 1) Japanese Patent Application Laid-Open No. 2011-193096

DISCLOSURE OF INVENTION

Technical Problem

By the way, a case in which the target vehicle informs the counter vehicle of wrong information about the switching destination channel or a case in which the counter vehicle misunderstands the information about the switching destination channel may occur. A case in which when vehicle-to-vehicle communication is performed by using a multi-hop function, a vehicle for relaying a signal does not exist because the channel is changed may occur.

Further, the target vehicle notifies the counter vehicle of information indicating that the channel is changed. However, the counter vehicle is notified unilaterally. Therefore, a case in which when the counter vehicle receives another service information provided on the SCH_1, the counter vehicle cannot respond to the notification occurs. In such case, communication between the target vehicle and the counter vehicle is disconnected.

In Japanese Patent Application Laid-Open No. 2011-193096, a method for recovering the communication between the target vehicle and the counter vehicle after the communication is disconnected is not proposed. Therefore, when the configuration described in Japanese Patent Application Laid-Open No. 2011-193096 is used, vehicle-to-vehicle communication cannot be continued.

Accordingly, a problem in which the reliability and the convenience of vehicle-to-vehicle communication performed by a group are low occurs.

A main object of the present invention is to provide a vehicle-mounted device used in an intelligent transport system, a communication method, and an intelligent transport system using these device and method.

Solution to Problem

In order to solve the above-mentioned problem, an invention according to a vehicle-mounted device is characterized by including member recruitment means which recruit members that perform vehicle-to-vehicle communication with each other by broadcasting an announcement of recruitment, identification information acquisition means which extract identification information for specifying a vehicle that responds to the recruitment of members from communication data sent from the vehicle, and transmission destination registration means which register the identification information of the member forming a group as a transmission destination of vehicle-to-vehicle communication.

Further, an invention according to a communication method for a vehicle-mounted device is characterized by including a member recruitment step for recruiting members that perform vehicle-to-vehicle communication with each other by broadcasting an announcement of recruitment, an identification information acquisition step for extracting identification information for specifying a vehicle that responds to the recruitment of members from communication data sent from the vehicle, and a transmission destination registration step for registering the identification information of the member forming a group as a transmission destination of vehicle-to-vehicle communication.

Further, an invention according to an intelligent transport system is characterized in that the invention according to an intelligent transport system includes an access point which puts a plurality of channels under control and casts various information and a vehicle-mounted device which directly communicates with the access point or is mounted on a vehicle which performs multi-hop communication, the access point includes broadcast means which broadcast a content of the information to be casted to a plurality of channels as service information, and the vehicle-mounted device includes channel switching means which perform a channel switching so that a desired service can be received on the basis of the service information.

Advantageous Effects of Invention

By using the present invention, vehicle-to-vehicle communication performed by a group in which the reliability and the convenience thereof are improved can be performed.

DESCRIPTION OF EMBODIMENTS

An exemplary embodiment of the present invention will be described. Further, as a communication method described below, for example, a geocast in which simultaneous transmissive communication is performed to only a vehicle which exists in an area designated by using location information of a terminal in a mobile ad-hoc network or a communication system of the third generation mobile communications system can be used. However, it is added that the communication method used for the present invention is not limited to these methods.

Figure 1:
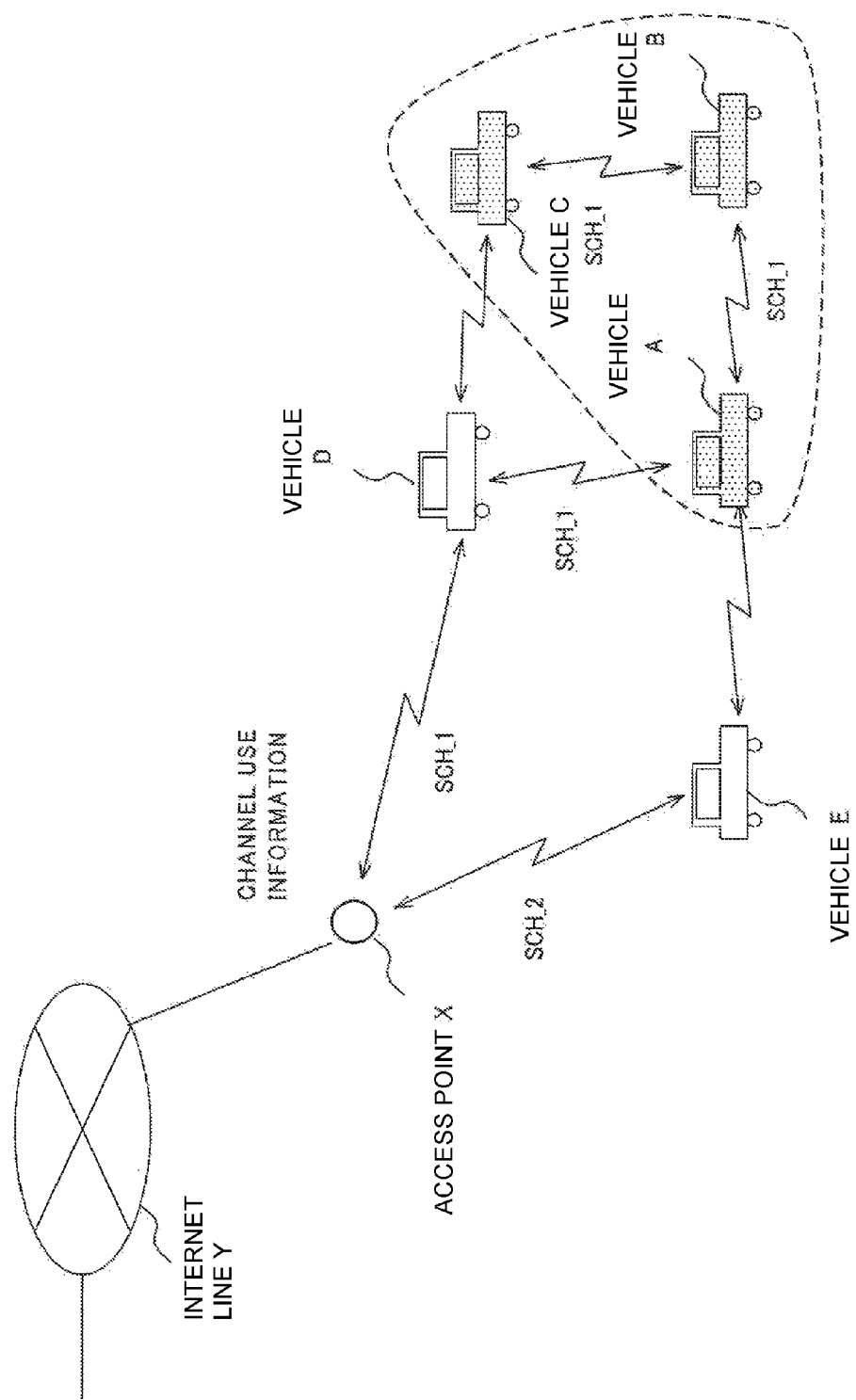
FIG. 1 is a schematic diagram of an intelligent transport system according to this exemplary embodiment.

FIG. 1 is a schematic diagram of an intelligent transport system according to this exemplary embodiment. The intelligent transport system is equipped with an access point X connected to an Internet line Y or the like. Vehicles (A to E) communicate with the access point X directly or by using multi-hop communication. Further, FIG. 1 shows an example of configuration of the intelligent transport system. Therefore, the number of the access points X and the number of the vehicles (A to E) are arbitrarily determined.

This access point X broadcasts various service information to the SCH. For convenience of explanation described below, it is assumed that the service information includes driving-related information about traffic jam, weather information about weather, and entertainment-related information about amusement. It is assumed that the SCH includes the SCH_1, the SCH_2, . . . , the driving-related information is casted by using the SCH_2, the weather information is casted by using the SCH_3, and vehicle-to-vehicle communication is performed by using the SCH_1.

Thus, because the access point X broadcasts the service information, for example, a user using the SCH_2 can get the content of the service provided by the SCH_3. Therefore, the convenience is improved.

Figure 2:
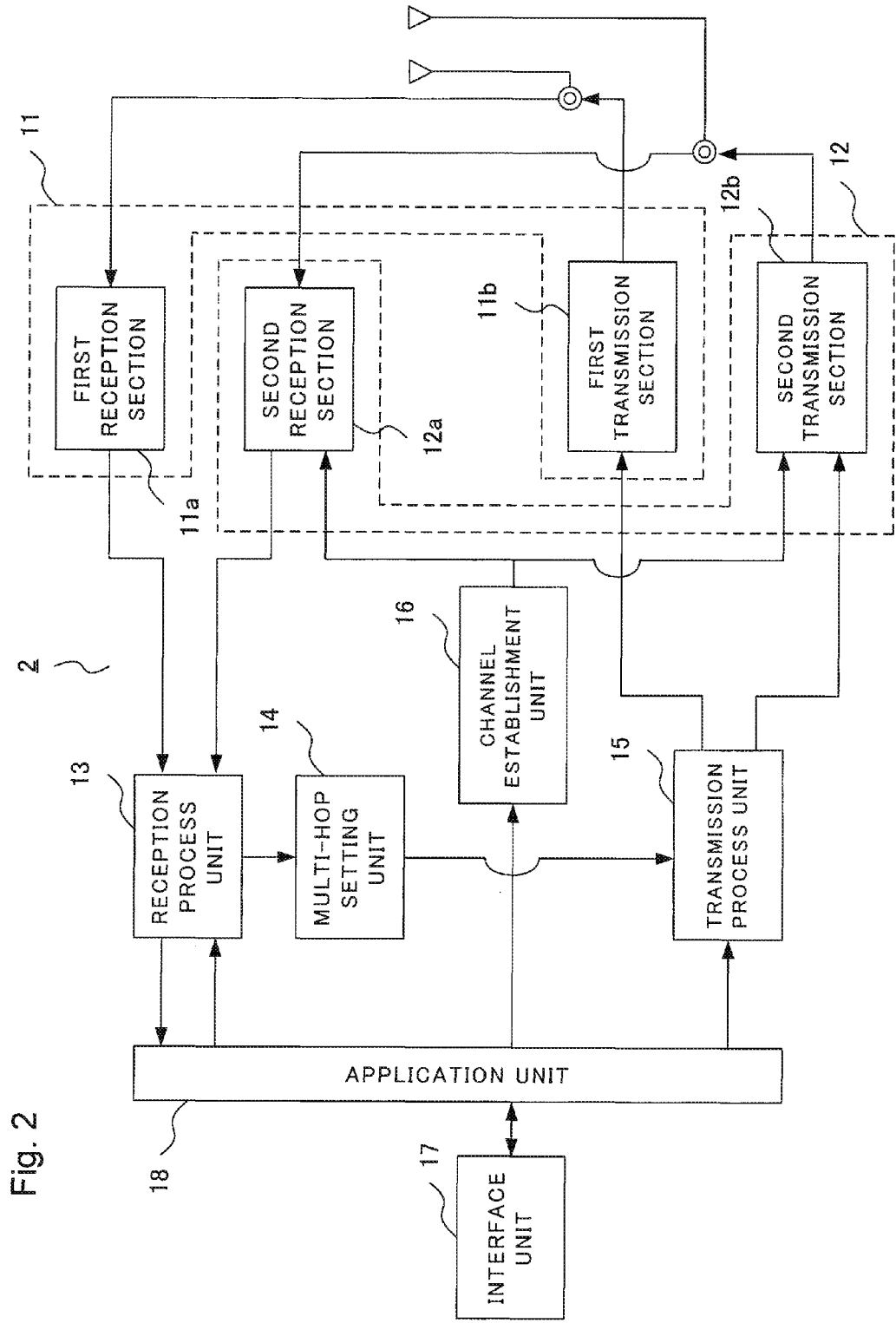
FIG. 2 is a block diagram of a vehicle-mounted device.

Such service is used via the vehicle-mounted device mounted on a vehicle or the like. FIG. 2 is a block diagram of a vehicle-mounted device 2 used for such service. This vehicle-mounted device 2 includes a first transmission and reception unit 11 including a first reception section 11a and a first transmission section 11b, a second transmission and reception unit 12 including a second reception section 12a and a second transmission section 12b, a reception process unit 13, a multi-hop setting unit 14, a transmission process unit 15, a channel establishment unit 16, an interface unit 17, and an application unit 18.

Further, because only one vehicle-mounted device 2 is mounted on the vehicle, in this exemplary embodiment, the vehicle-mounted device may be described as the vehicle in the explanation. For example, "the vehicle A performs vehicle-to-vehicle communication with the vehicle B" means "the user of the vehicle A performs vehicle-to-vehicle communication with the user of the vehicle B by using the vehicle-mounted device 2 mounted on the vehicle A and the vehicle-mounted device 2 mounted on the vehicle B.

The first transmission and reception unit 11 and the second transmission and reception unit 12 perform packet communication by using the different channels (frequencies) from each other. In this case, it is assumed that the first transmission and reception unit 11 uses the CCH and the second transmission and reception unit 12 uses the SCH.

The communication data transmitted from the first transmission and reception unit 11 and the second transmission and reception unit 12 includes data addressed to the own device (vehicle-mounted device 2) (hereinafter, referred to as data addressed to own device), data transferred to another vehicle-mounted device 2 by using multi-hop communication (hereinafter, referred to as transfer data), and broadcasted data (hereinafter, referred to as broadcast data) such as a control packet whose transmission destination is not specified, service information, or the like.

This communication data is the packet data and the identification information indicating the transmission destination is added to it. Accordingly, the reception process unit 13 detects this identification information and determines the destination of the communication data. When the received communication data is the data addressed to own device or the broadcast data, the reception process unit 13 sends it to the application unit 18. Further, when the received communication data is the broadcast data or the transfer data, the reception process unit 13 sends the data to the multi-hop setting unit.

The multi-hop setting unit 14 confirms the destination address of the communication data received from the reception process unit 13, the number of hops, and the like and determines whether or not it has to be transferred to another vehicle. When it is determined that the received communication data has to be transferred, the multi-hop setting unit 14 outputs the transfer data and the broadcast data to the transmission process unit 15.

The transmission process unit 15 outputs the data transmitted by the application unit 18 and the data received from the multi-hop setting unit 14 to the first transmission section 11a and the second transmission section 12b according to a setting of the application unit 18 and the multi-hop setting units 14.

The channel establishment unit 16 establishes a channel in the first transmission and reception unit 11 and the second transmission and reception unit 12 according to an instruction from the application unit 18 or an instruction from the user. Namely, the CCH is established for the first transmission and reception unit 11 and the SCH_2 or the like of the SCH is established for the second transmission and reception unit 12.

The interface unit 17 is a user interface having a display function to display various information from the application unit 18 and an input function to input an instruction of the user.

Figure 3A:
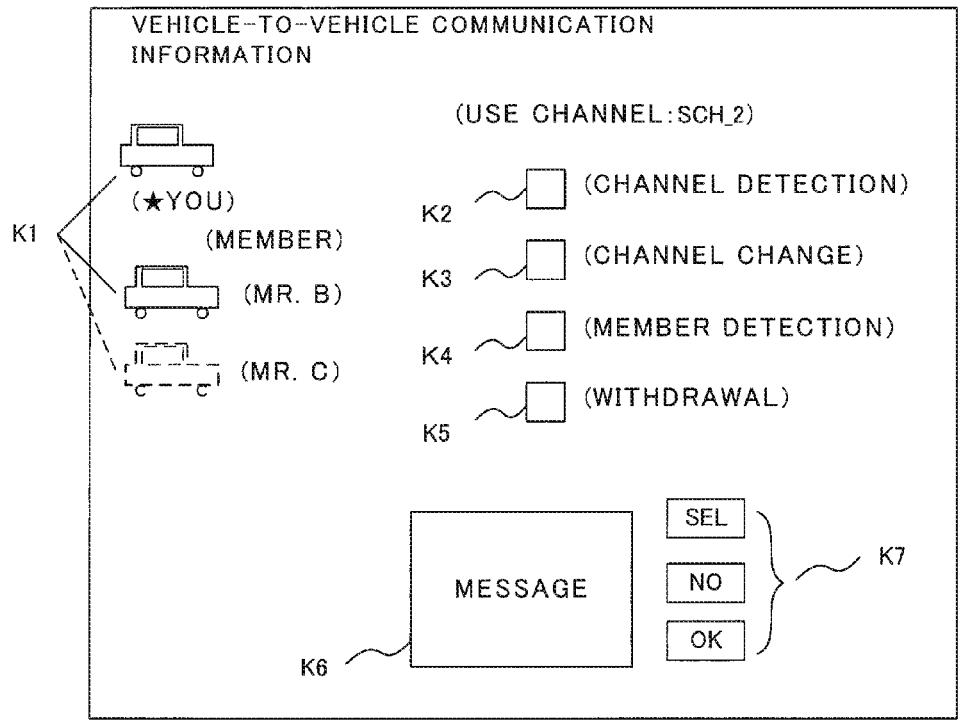
FIG. 3A shows an example of a display screen of a host side by a display function in an interface unit.
Figure 3B:
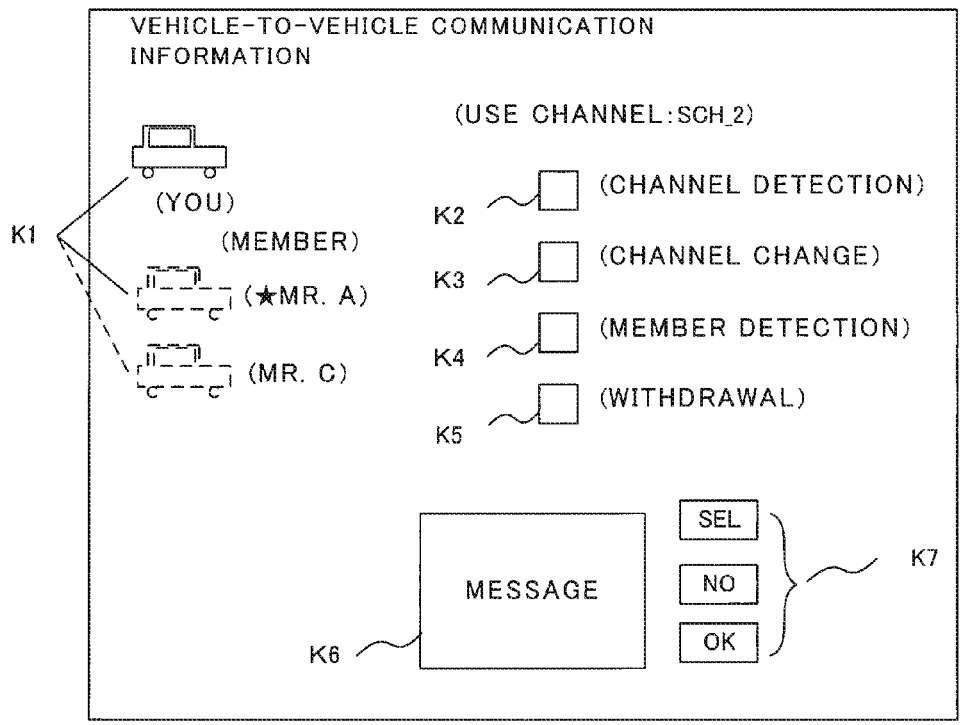
FIG. 3B shows an example of a display screen of a guest side by a display function in an interface unit.

FIGS. 3A and 3B show an example of a display screen in which the information is displayed by the display function of the interface unit 17. Further, FIGS. 3A and 3B show a display screen in which information of a group performing vehicle-to-vehicle communication is displayed. FIG. 3A shows a display screen of a host side and FIG. 3B shows a display screen of a guest side. Further, the host and the guest are designated by an agreement of the group. In the following example, the vehicle A is the host and the vehicles B and C are the guests. A "mark" is put to the host vehicle to identify it. In FIG. 3, the vehicle which has a vehicle mark K1 indicated by a dashed line cannot communicate with another member. For example, in FIG. 3A, the vehicle C which has the vehicle mark K1 indicated by a dashed line cannot perform vehicle-to-vehicle communication with the other members (vehicles A and B).

The vehicle marks K1 to K7 shown in FIGS. 3A and 3B will be described below. The vehicle mark K1 is a label indicating a member of a group which performs vehicle-to-vehicle communication. A channel detection button K2 is a switch depressed when detecting whether or not a communication pass of the channel to be used can be established. A channel change button K3 is a switch depressed when changing the channel. A member detection button K4 is a switch depressed when detecting the member. A withdrawal button K5 is a switch depressed when issuing a notification of withdrawal from the member. A message column K6 is a display column in which various messages are displayed. An answer button K7 is a switch depressed when answering an inquiry about a message or the like and includes a selection button (SEL button), a no approval button (NO button), and an approval button (OK button). Of course, another switch can be provided for another function. This is not against the spirit of the present invention.

The application unit 18 receives the data addressed to own device and the broadcast data from the reception process unit 13 and performs the process corresponding to these data. The application unit 18 outputs the data transmitted to the another vehicle-mounted device 2 to the transmission process unit 15 for vehicle-to-vehicle communication or the like. Further, the application unit 18 outputs a channel establishment request which designates a channel SCH_x (x=1, 2, . . . ) to be used and a detection request which gives an instruction to detect the member to the channel establishment unit 16 and outputs the identification information of the member to be detected to the reception process unit 13.

Next, the detailed configuration of such vehicle-mounted device 2 will be described together with (1) a group creation process, (2) a channel change process, and (3) a member detection process.

(1) Group Creation Process

Figure 4:
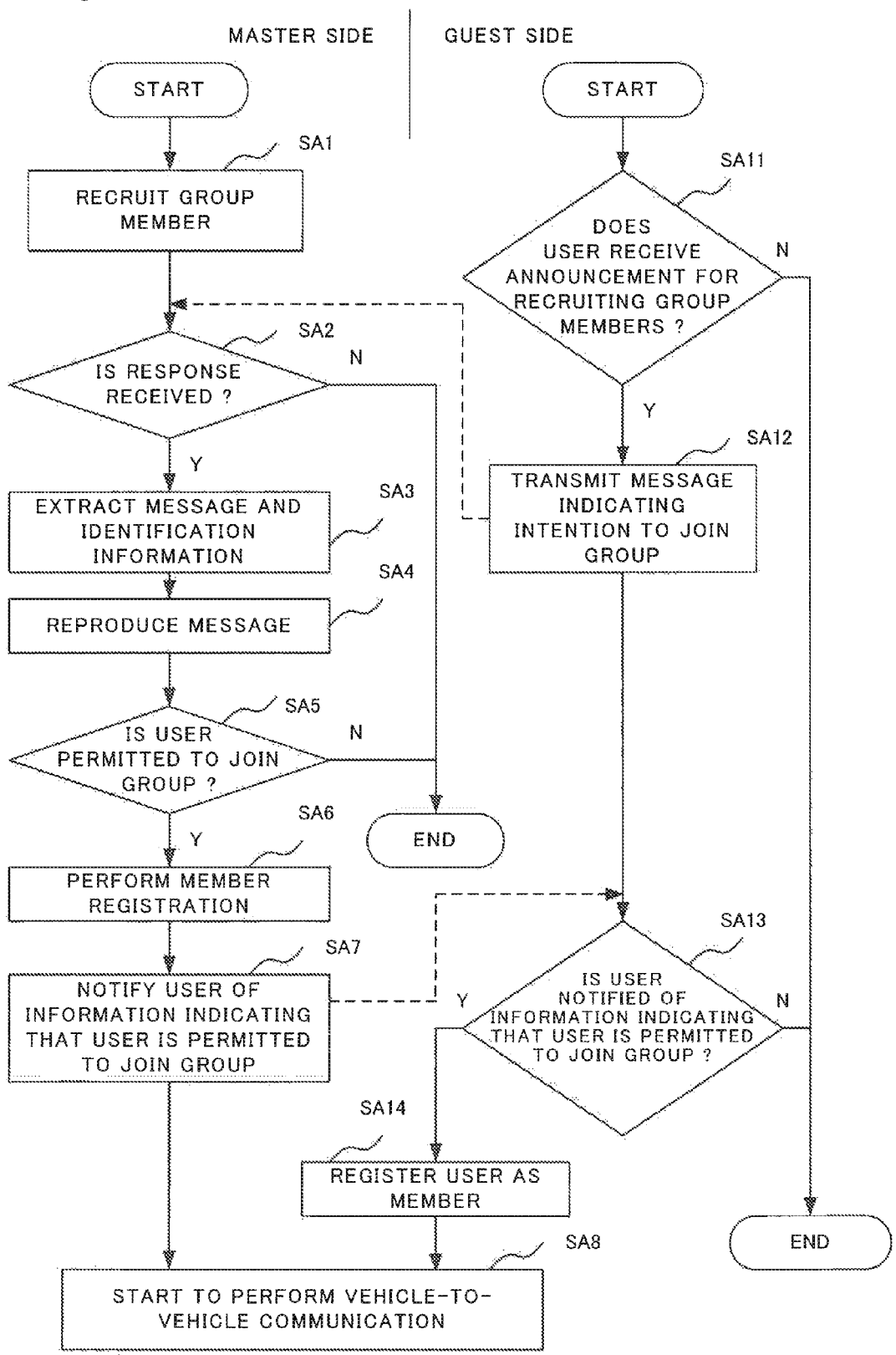
FIG. 4 is a flowchart showing a group creation process.

Next, the member detection process will be described. When the vehicle-to-vehicle communication starts, each member stores the identification information of another member and whereby, the group is created. This group creation process will be described with reference to FIG. 4.

Step SA1: In order to create a group, the user of the vehicle A recruits group members through the SCH_2 by broadcasting an announcement of recruitment and the group is created. It is assumed that the user of the vehicle B joins the group in response to this recruitment. In this case, it is assumed that the vehicle A is the host vehicle and the vehicle B is the guest vehicle.

Steps SA11 and SA12: The user of the vehicle B notifies the host vehicle of a message indicating an intention to join the group, such as "the vehicle B joins the group" or the like in response to the announcement for recruiting group members. The communication data sent from the vehicle B includes the identification information of the vehicle B that is a transmission source and the identification information of the vehicle A that is the transmission destination.

Steps SA2 and SA3: The reception process unit 13 of the vehicle A outputs the received communication data to the application unit because the received communication data includes the identification information addressed to the vehicle A. The application unit extracts the message ("the vehicle B joins the group") of the vehicle B and the identification information from the communication data. The message is outputted to the interface unit as a voice signal and the identification information is stored in an internal memory.

Steps SA4 and SA5: The interface unit reproduces the message as a voice. When the user of the vehicle A hears this message voice ("the vehicle B joins the group") and permits the user of the vehicle B to join the group, the user of the vehicle A depresses the OK button. By this operation, the interface unit outputs an OK signal to the application unit and the application unit transmits the identification information of the vehicle B to the interface unit and the transmission process unit.

Steps SA6 and SA7: The interface unit displays the received identification information and the vehicle mark. For example, in FIGS. 3A and 3B, the user name of "Mr. B" is displayed on the basis of the "identification information". Further, the transmission process unit registers the identification information sent from the application unit as the transmission destination and notifies the vehicle B of information indicating that the vehicle B is permitted to join the group.

Steps SA13 and SA14: When the user of the vehicle B receives the notification of the approval, the member registration is performed. In this case, the procedure of member registration is the same as the procedure of member registration for the vehicle A.

Step SA8: As described above, when the user of the vehicle A recruits group member by broadcasting an announcement of recruitment, the vehicle B wants to join the group, the vehicle B is permitted to join the group, and the vehicle-to-vehicle communication performed by a group starts.

Further, in the above-mentioned explanation, although the procedure for creating the group by two parties (the vehicle A and the vehicle B) has been explained, this can be applied to a case in which another vehicle newly joins the existing group.

(2) Channel Change Process

Next, the channel change process will be described. FIG. 1 shows a case in which vehicle-to-vehicle communication is performed by a group of the vehicles A, B, and C. In this case, it is assumed that the vehicle A and the vehicle B are located in a radio wave arrival range of each other, the vehicle B and the vehicle C are located in a radio wave arrival range of each other, and two vehicles perform direct vehicle-to-vehicle communication by using the SCH_1. However, because the vehicle A and the vehicle C do not exist in the radio wave arrival range of each other, the vehicle A and the vehicle C perform multi-hop vehicle-to-vehicle communication by using the SCH_1 via the vehicle D. On the other hand, it is assumed that the vehicle D communicates with a service point X by using the SCH_1 and the vehicle E communicates with the service point X by using the SHC_2.

Figure 5:
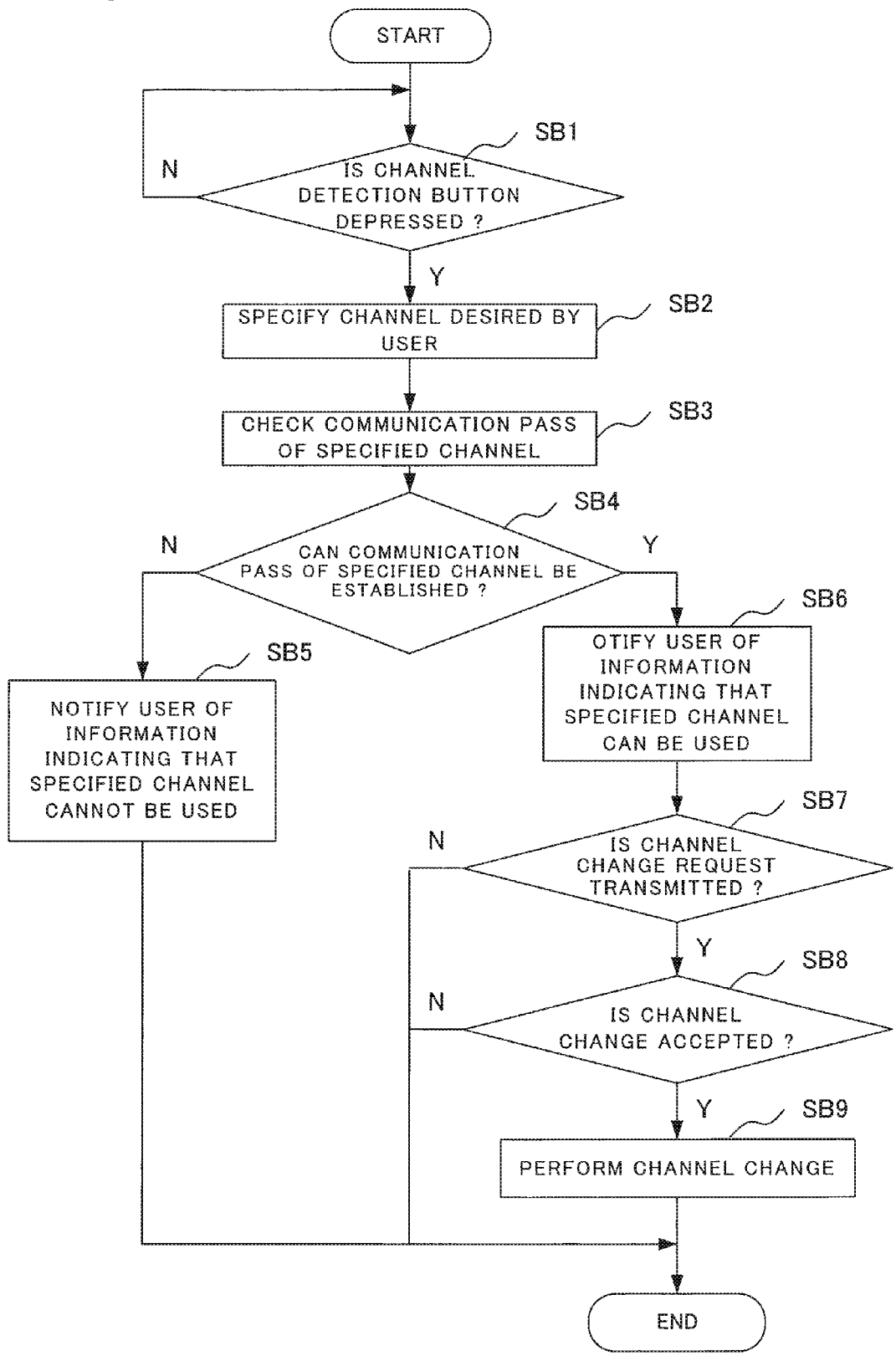
FIG. 5 is a flowchart showing a channel change process.

FIG. 5 is a flowchart showing a channel change process. It is assumed that when the vehicle A performs vehicle-to-vehicle communication by using the SCH_1, the vehicle A receives service information via the vehicle D. This service information is broadcasted by the service point X by using each channel (SCH_1, SCH_2, . . . ). The service information is for example, information about traffic jam, weather information, a TV program, or the like.

It is assumed that the user of the vehicle A wants to use the information about traffic jam in this service information provided by the SHC_2 while performing vehicle-to-vehicle communication. However, because the user of the vehicle A performs vehicle-to-vehicle communication by using the channel of SCH_1, the user of the vehicle A cannot use the information about traffic jam provided by the SHC_2. Accordingly, the user of the vehicle A recognizes the need of change of the channel for performing vehicle-to-vehicle communication from the SCH_1 to the SCH_2.

Step SB1: The communication path varies according to the position of the vehicle A and the position of another vehicle located around the vehicle A and these positions change every moment. Accordingly, at this moment, it is unclear whether or not the communication path can be established between the vehicle A and the service point X by using the SCH_2. Accordingly, the user of the vehicle A depresses a channel detection button K2. When the channel detection button K2 is depressed, a list of the available channels (it is not taken into consideration whether or not the communication path can be established) based on the service information or the like is displayed in the message column K6. The user operates the SEL button in the answer buttons K7 to select the desired channel and depresses the OK button.

Step SB2: By this operation, the channel desired by the user is specified and the channel detection request is outputted from the interface unit 17 to the application unit 18. This channel detection request is a channel code for specifying the channel that the user wants to use.

Steps SB3 and SB4: The application unit 18 outputs the channel detection request to the channel establishment unit 16. When the channel establishment unit 16 receives the channel detection request, the channel establishment unit 16 detects a time which is not used for vehicle-to-vehicle communication and establishes the channel for the second transmission and reception unit 12 to the channel (in this case, the SCH_2) specified by the channel detection request only for the predetermined time (the channel detection time). After the elapse of the channel detection time, the channel establishment unit 16 establishes the channel to the channel used originally (the SCH_1) and vehicle-to-vehicle communication is continued.

Further, the time which is not used for vehicle-to-vehicle communication is not limited in particular. However, for example, the time in which the packet data characterized by the identification information of the member performing vehicle-to-vehicle communication is not received can be used. When the channel is established to the SCH_2 only for the time corresponding to at least one or two packet lengths, it can be determined whether or not the communication pass can be established because of the reason described later. Therefore, it is not inconvenience to change the channel to the SCH_2 even when vehicle-to-vehicle communication is performed.

The communication data received within the channel detection time is sent to the application unit 18 via the reception process unit 13. The broadcasted information such as the channel information or the like is information casted by the service point X. Accordingly, the application unit 18 determines whether or not the communication data received within the channel detection time includes the broadcasted information.

When the broadcasted information is not included, the process proceeds to step SB5 because the communication path using the SCH_2 cannot be established. When the broadcasted information is included, the process proceeds to step SB6 because the communication path using the SCH_2 can be established.

Step SB5: Because the communication path using the SCH_2 cannot be established, the application unit 18 makes the interface unit 17 display the message such as "the communication pass cannot be established" or the like in the message column and the process ends.

Step SB6: When the communication path using the SCH_2 is established between the vehicle A and the service point X, the application unit 18 notifies the interface unit 17 of information indicating that the communication path using the designated channel is established.

Step SB7: When the interface unit 17 is notified of the information indicating that the SCH_2 can be used from the application point 18, the interface unit 17 displays a message such as "the SCH_2 can be used and do you ask the member to change the channel for vehicle-to-vehicle communication?" in the message column K6 in order to seek confirmation as to the channel change request.

When this message is displayed and the channel change request continues (when the user still wants to acquire information about traffic jam at the time), the user of the vehicle A depresses the OK button. In a case in which it is not necessary to change the channel because information about traffic jam can be acquired by another method or the like, the user of the vehicle A depresses the NO button and the process ends.

Step SB8: The channel change request from the vehicle A is transmitted to each member and displayed in the message column K6 of the interface unit 17 of the each member.

When the member reads the message and accepts the channel change, the member depresses the OK button.

In a case in which one of the members (for example, the user of the vehicle B) receives another service (for example, the weather information) by using the SCH_1, when the channel is changed to the SCH_2, the member (the user of the vehicle B) cannot acquire the weather information. Therefore, the user of the vehicle B depresses the NO button because the user of the vehicle B cannot accept the channel change and the process ends.

When all the members respond to the channel change request, the application unit 18 of the vehicle A which asks the member to change the channel determines whether or not all the members accept the channel change. When all the members accept the channel change, the application unit 18 of the vehicle A makes the interface unit display a message of "the channel is changed because all the members accept the channel change" in the message column K6.

Step SB9: After this process, the application unit 18 outputs a message for asking all the members to change the channel from the SCH_1 to the SCH_2 to the transmission process unit 15 and instructs the channel establishment unit 16 of the vehicle A to change the channel from the SCH_1 to the SCH_2. The transmission process unit 15 transmits a message requesting the channel change to all the members and all the members change the channel according to the message.

By using the procedure described above, the desired channel path is confirmed and when all the members accept the change of the channel, the channel can be changed.

(3) Member Detection Process

Figure 6:
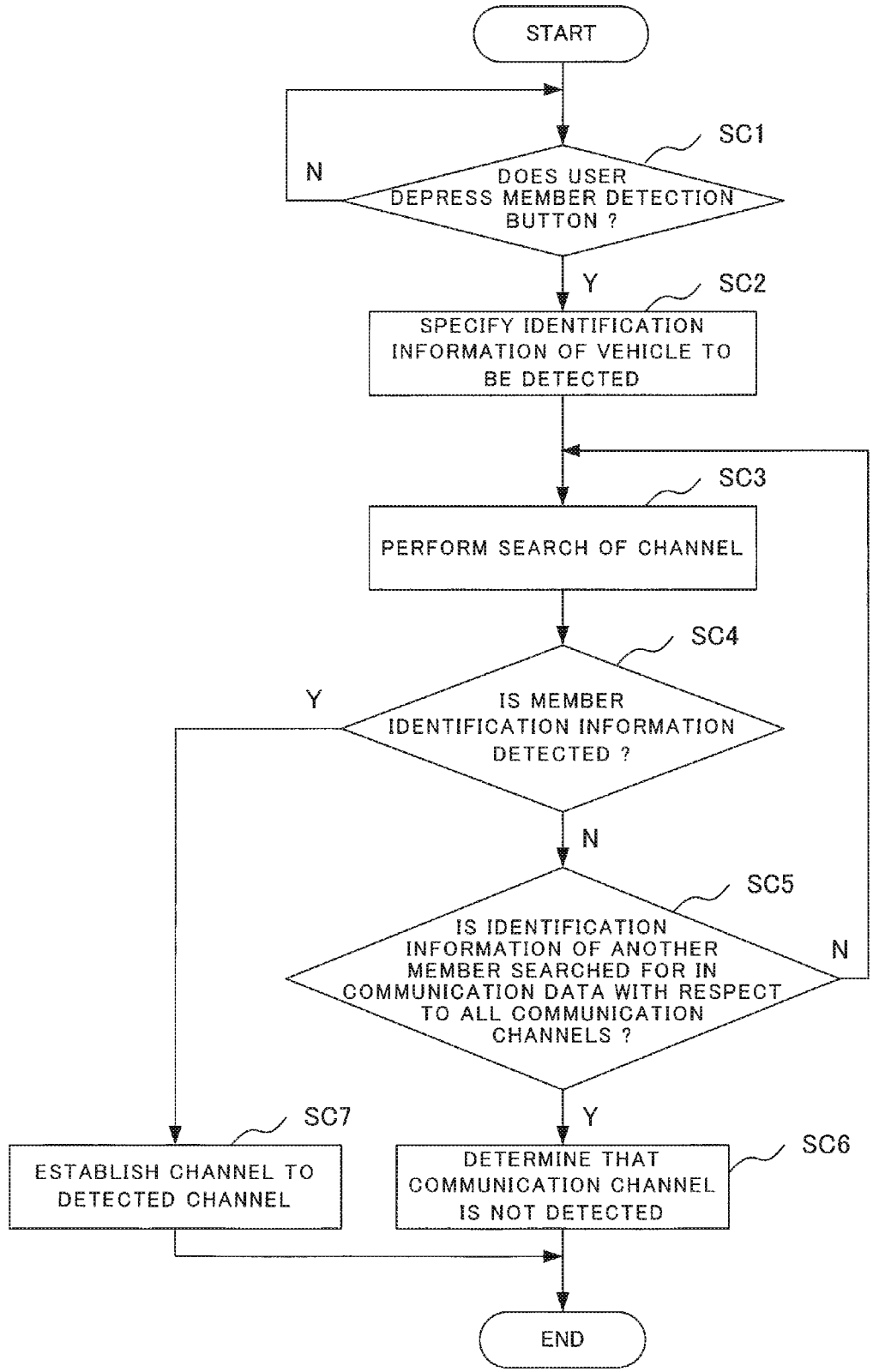
FIG. 6 is a flowchart showing a member detection process.

Next, the member detection process will be described with reference to the flowchart shown in FIG. 6. Further, the following cases are considered: a case in which another vehicle cuts into the lane so that the vehicle C gets separated from the preceding vehicles A and B and whereby, vehicle-to-vehicle communication cannot be performed and a case in which the vehicle C misunderstands the destination channel in the channel change process mentioned above (for example, the vehicle C understands the destination channel as the SCH_3 instead of the SCH_2 wrongly) or the like and whereby, vehicle-to-vehicle communication cannot be performed.

When the vehicle C loses sight of the other vehicles A and B, it can be easily detected because the vehicle mark K1 of another member's vehicle is indicated by a dotted line in FIGS. 3A and 3B. Further, the vehicle mark K1 is indicated by the dotted line. However, this is shown as an example. Therefore, various methods such as the use of different colors, the use of blinking characters, or the like can be used.

Accordingly, in order to deal with such situation, the guest vehicle (in this case, the vehicle C) performs the member detection process. In the following explanation, a case in which the vehicle C detects the vehicles A and B is taken as an example.

It is assumed that the vehicle C detects the vehicles A and B and vehicle-to-vehicle communication can be performed again. In this case, when assuming that all the members perform the member detection, a case in which the detection cannot be performed because of misunderstanding may occur. Accordingly, the member detection is performed by the guest vehicle. In the above-mentioned assumption, the vehicle C performs the member detection.

Steps SC1 and SC2: When the user of the vehicle C depresses the member detection button, the interface unit 17 displays a history of vehicle-to-vehicle communication (only the latest history may be displayed). The user of the vehicle C selects the identification information of the vehicle to be detected from this history. In this case, a plurality of identification information can be selected. By this operation, the identification information of the vehicle to be detected is specified and outputted to the application unit 18.

Step SC3: The application unit 18 outputs the detection request from the interface unit 17 and the identification information to the reception process unit 13 and outputs the detection request to the channel establishment unit 16.

When the reception process unit 13 receives the detection request and the identification information from the application unit 18, the reception process unit 13 stores the identification information in an internal memory (not shown). The channel establishment unit 16 changes the available channel in order and sets the reception unit so that the reception can be performed. In this case, because the vehicle C uses the CCH by the first transmission and reception unit 11, the channel of the second transmission and reception unit 12 is changed in order.

Step SC4: The reception process unit 13 extracts the destination of the communication data received by changing the channel. Because the vehicle C is a member performing vehicle-to-vehicle communication, the communication data transmitted by the vehicles A and B includes the vehicle C as the destination. Accordingly, when the identification information of the vehicle A or the vehicle B is included in the communication data, it can be determined that the vehicles A and B perform vehicle-to-vehicle communication by using the channel through which this communication data is received.

Steps SC5 and SC6: The identification information of another member is searched for in the communication data received through each channel. This search is performed with respect to all the channels. When the identification information of another member is not found in the communication data, it is determined that the communication channel is not detected and the process ends.

Step SC7: On the other hand, when the identification information of another member is found in the communication data received through a certain channel, it is determined that the detection succeeds and the channel establishment unit establishes the channel to the certain channel. As a result, the user of the vehicle C can perform vehicle-to-vehicle communication with the users of the vehicles A and B.

The invention of the present application has been described above with reference to the exemplary embodiment (and the example). However, the invention of the present application is not limited to the above mentioned exemplary embodiment (and the example). Various changes in the configuration or details of the invention of the present application that can be understood by those skilled in the art can be made without departing from the scope of the invention.

This application claims priority from Japanese Patent Application No. 2013-190155 filed on Sep. 13, 2013, the disclosure of which is hereby incorporated by reference in its entirety.

REFERENCE SIGNS LIST 2 vehicle-mounted device
11 first transmission and reception unit
11a first reception section
11b first transmission section
11a first transmission section
12 second transmission and reception unit 12*a* second reception section
12*b* second transmission section
13 reception process unit
14 multi-hop setting unit
15 transmission process unit
16 channel establishment unit
17 interface unit
18 application unit

The invention claimed is:

1. A vehicle-mounted device mounted on a vehicle using an intelligent transport system comprising:
   member recruitment unit which recruit members that perform vehicle-to-vehicle communication with each other by broadcasting an announcement of recruitment;
   identification information acquisition unit which extract identification information for specifying a vehicle that responds to the recruitment of members from communication data sent from the vehicle;
   transmission destination registration unit which register the identification information of the member forming a group as a transmission destination of vehicle-to-vehicle communication;
   communication path check unit which check whether or not one of services shown in service information can be received when the members perform vehicle-to-vehicle communication using a predetermined channel by changing a channel to the channel through which the service is provided at a predetermined condition;
   channel change inquiry unit which make an inquiry to another member about the change of the channel used for vehicle-to-vehicle communication when the service can be received; and
   channel change unit which change the channel when all the members accept the change of the channel.

2. The vehicle-mounted device described in claim 1 further comprising:
   member detection unit which acquire the communication data by changing the channel in order when one member cannot perform vehicle-to-vehicle communication with another member and determine whether or not the identification information of the another member stored at the time of performing vehicle-to-vehicle communication is included in the acquired communication data; and
   channel establishment unit which establish the channel to the channel through which the communication data is acquired when the identification information of the another member is included in the acquired communication data.

3. A communication method of a vehicle-mounted device mounted on a vehicle using an intelligent transport system comprising:
   recruiting members that perform vehicle-to-vehicle communication with each other by broadcasting an announcement of recruitment;
   extracting identification information for specifying a vehicle that responds to the recruitment of members from communication data sent from the vehicle;
   registering the identification information of the member forming a group as a transmission destination of vehicle-to-vehicle communication;
   checking whether or not one of services shown in service information can be received when the members perform vehicle-to-vehicle communication using a predetermined channel by changing a channel to the channel through which the service is provided at a predetermined condition;
   inquiring of another member the change of the channel used for vehicle-to-vehicle communication when the service can be received; and
   changing channel when all the members accept the change of the channel.

4. The communication method for a vehicle-mounted device described in claim 3 further comprising:
   acquiring the communication data by changing the channel in order when one member cannot perform vehicle-to-vehicle communication with another member and it is determined whether or not the identification information of the another member stored at the time of performing vehicle-to-vehicle communication is included in the acquired communication data; and
   establishing the channel through which the communication data is acquired when the identification information of the another member is included in the acquired communication data.

5. An intelligent transport system comprising:
   an access point which puts a plurality of channels under control and casts various information; and
   a vehicle-mounted device which directly communicates with the access point or is mounted on a vehicle which performs multi-hop communication,
   wherein the access point includes broadcast unit which broadcasts a content of the information to be casted to a plurality of channels as service information, and
   wherein the vehicle-mounted device comprises:
   member recruitment unit which recruit members that perform vehicle-to-vehicle communication with each other by broadcasting an announcement of recruitment;
   identification information acquisition unit which extract identification information for specifying a vehicle that responds to the recruitment of members from communication data sent from the vehicle; and
   transmission destination registration unit which register the identification information of the member forming a group as a transmission destination of vehicle-to-vehicle communication;
   communication path check unit which check whether or not one of services shown in service information can be received when the members perform vehicle-to-vehicle communication using a predetermined channel by changing a channel to the channel through which the service is provided at a predetermined condition;
   channel change inquiry unit which make an inquiry to another member about the change of the channel used for vehicle-to-vehicle communication when the service can be received; and
   channel change unit which change the channel when all the members accept the change of the channel.

\* \* \* \* \*